(12) United States Patent
Huang et al.

(10) Patent No.: US 12,534,811 B2
(45) Date of Patent: Jan. 27, 2026

(54) CARBON FIBER-REINFORCED POLYMER ACTIVE-PASSIVE-CONFINED COMPRESSION-CAST REINFORCED CONCRETE COLUMN INCORPORATING CATHODIC PROTECTION

(71) Applicant: SHENZHEN UNIVERSITY, Shenzhen (CN)

(72) Inventors: Xiaoxu Huang, Shenzhen (CN); Biao Hu, Shenzhen (CN); Tao Du, Shenzhen (CN); Yingwu Zhou, Shenzhen (CN); Ruibo Liu, Shenzhen (CN); Yufei Wu, Shenzhen (CN); Xiaoqing Zhou, Shenzhen (CN); Xianfeng Wang, Shenzhen (CN); Menghuan Guo, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 19/012,161

(22) Filed: Jan. 7, 2025

(65) Prior Publication Data

US 2025/0320609 A1 Oct. 16, 2025

(30) Foreign Application Priority Data

Apr. 12, 2024 (CN) .......................... 202410441965.8

(51) Int. Cl.
C23F 13/08 (2006.01)
B28B 3/04 (2006.01)
E04C 3/34 (2006.01)

(52) U.S. Cl.
CPC ................ C23F 13/08 (2013.01); B28B 3/04 (2013.01); E04C 3/34 (2013.01); *C23F 2201/02* (2013.01)

(58) Field of Classification Search
None
See application file for complete search history.

(56) References Cited

U.S. PATENT DOCUMENTS 8,281,545 B2 * 10/2012 Choi .................... E04C 3/34
52/847
9,677,274 B2 * 6/2017 Saiidi .................. E04C 3/34
(Continued)

FOREIGN PATENT DOCUMENTS

CN 113216263 A 8/2021
CN 217669982 U 10/2022

OTHER PUBLICATIONS

Xiamuxi et al ("Optimum reinforcement ratio of axially loaded reinforced concrete-filled square steel tube column", Journal of Constructional Steel Research, 203 (2023) 107805 (Year: 2023).*
(Continued)

*Primary Examiner* — Alexander W Keeling
(74) *Attorney, Agent, or Firm* — WCF IP

(57) ABSTRACT

Provided is a CFRP active-passive-confined compression-cast RC column incorporating cathodic protection, which includes a CFRP pipe; multiple longitudinal reinforcements inside the CFRP pipe; a stirrup inside the CFRP pipe connected to the longitudinal reinforcements; compression-cast concrete arranged in the CFRP pipe, the multiple longitudinal reinforcements and the stirrup are embedded in the compression-cast concrete; a power supply having a positive electrode connected to the CFRP pipe and a negative electrode connected to the multiple longitudinal reinforcements. The CFRP pipe with a present thickness forms an active confinement on the compression-cast concrete, and the power supply applies a current to the CFRP pipe as an anode to enable the multiple longitudinal reinforcements to (Continued)

obtain electrons, thus stably protecting the multiple longitudinal reinforcements as a cathode.

10 Claims, 7 Drawing Sheets

(56) References Cited

U.S. PATENT DOCUMENTS

| | | | | |
|---|---|---|---|---|
| 10,378,114 B2* | 8/2019 | Zhu | ............... | C23F 13/06 |
| 2023/0139840 A1* | 5/2023 | Zhang | ............ | G06F 30/13 |
| | | | | 52/649.4 |

OTHER PUBLICATIONS

Orozco ("Strain limits vs. reinforcement ratio limits—A collection of new and old formulas for the design of reinforced concrete sections", Case Studies in Structural Engineering, 4 (2015) 1-13) (Year: 2015).*

Zhang et al ("Effect of stirrup ratio on impact response of BFRP-reinforced concrete beams under different energy levels", International Journal of Impact Engineering vol. 173, Mar. 2023, 104472) (Year: 2023).*

Li et al ("Summary of mechanical properties of stirrup confined concrete", Academic Journal of Architecture and Geotechnical Engineering, vol. 6, Issue 1: 79-83) (Year: 2024).*

Yi-Yan et al ("Active and passive protection of steel reinforcement in concrete column using carbon fibre reinforced polymer against corrosion", Electrochimica Acta, vol. 278, Jul. 10, 2018, pp. 124-136). (Year: 2018).*

Hongfang et al ("Degradation of the Three-Phase Boundary Zone of Carbon Fiber Anodes in an Electrochemical System", ACS Omega, 2023, 8, 26359-26368). (Year: 2023).*

Ho-Jin et al ("Three-dimensional carbon fiber composite printer for CFRP repair", Composites Part B: Engineering vol. 174, Oct. 1, 2019, 106945). (Year: 2019).*

CNIPA, Office Action, Application No. 202410441965.8, Aug. 23, 2024.

* cited by examiner designing target parameters of the CFRP active-passive-confined compression-cast reinforced concrete column incorporating cathodic protection, wherein the target parameters comprise a concrete mix proportion, a longitudinal reinforcement ratio, a stirrup ratio, a present thickness of a CFRP pipe, and compression casting stress of compression-cast concrete — S101 constructing the CFRP pipe on a formwork holder according to the present thickness — S102 enabling a plurality of longitudinal reinforcements and a stirrup to form an internal reinforcement assembly according to the longitudinal reinforcement ratio and the stirrup ratio, and placing the internal reinforcement assembly into the CFRP pipe — S103 pouring concrete into the formwork holder according to the concrete mix proportion, and carrying out compression casting according to the compression casting stress to obtain a CFRP active-passive-confined compression-cast reinforced concrete column incorporating cathodic protection — S104

FIG. 4

CARBON FIBER-REINFORCED POLYMER ACTIVE-PASSIVE-CONFINED COMPRESSION-CAST REINFORCED CONCRETE COLUMN INCORPORATING CATHODIC PROTECTION

CROSS-REFERENCE TO RELATED APPLICATION

This patent application claims the benefit and priority of Chinese Patent Application No. 202410441965.8 filed with the China National Intellectual Property Administration on Apr. 12, 2024, the disclosure of which is incorporated by reference herein in its entirety as part of the present application.

TECHNICAL FIELD

The present disclosure relates to the technical field of RC structures, and in particular to a carbon fiber-reinforced polymer (CFRP) active-passive-confined compression-cast reinforced concrete (RC) column incorporating cathodic protection.

BACKGROUND

The research on the seismic performance of RC columns has always been an important topic in the field of structural engineering. RC columns, as one of the most widely used structural elements in civil engineering infrastructure construction, are usually used as load-bearing structures of buildings or bridges, and have the characteristics, such as low cost, extensive materials, robustness, and durability. However, RC structures used in coastal areas are facing serious problems of corrosion of internal reinforcement assembly in RC structures due to long-term exposure to high temperature, high humidity and high chloride ion environment, which may seriously reduce the durability and seismic performance of the structure and even lead to the destruction of the structure. For the durability problem of the RC structures in coastal environments, the durability and seismic capacity of the RC columns can be improved by developing new materials such as high-performance concrete and fiber-reinforced concrete, and adopting anti-corrosion protection measures and effective monitoring and maintenance means, thus ensuring the safety, reliability and long-term service performance of the structures.

The following are some common techniques to improve the seismic performance of concrete. Firstly, steel tube confinement: when concrete is poured into the steel tube, the lateral resistance and bearing capacity of the column are improved through the stiffness and strength of the steel plate. The steel tube confinement can effectively increase the flexural stiffness and seismic performance of columns. However, the steel tube confinement requires accurate design and construction, which needs to the increase of cost and construction difficulty. Secondly, hoop confinement: the hoop confinement surrounds reinforced rings around the RC column, thus improving the seismic performance of the RC column by confining the outer side of the column. The hoop confinement has good adaptability and construction feasibility, which can effectively improve the bearing capacity and ductility of the column. However, the hoop confinement may increase the volume and weight of the column, and special treatment is required at the joint of the top and bottom of the column. Thirdly, CFRP confinement: CFRP confinement technology is a novel confinement technology developed in recent years. CFRP strips or sheets can be wrapped around the surface of the RC column and fixed by adhesive to form a CFRP confinement layer. The CFRP confinement has the characteristics of high strength, lightweight and corrosion resistance, which can effectively increase the strength and stiffness of the column and improve the seismic performance thereof.

However, the state of reinforcements in the concrete is also an important factor affecting the seismic performance of the concrete, and the simple CFRP confinement has little effect on inhibiting the corrosion of reinforcements in the concrete. Therefore, how to effectively inhibit the corrosion of the internal reinforcement assembly of the concrete while significantly improving the performance of the RC structure is a difficult problem at present.

Therefore, the prior art needs to be improved and developed.

SUMMARY

A main objective of the present disclosure is to provide a CFRP active-passive-confined compression-cast RC column incorporating cathodic protection, aiming at solving the problem of poor seismic performance of concrete caused by a situation that a RC structure is easy to corrode in a coastal environment in the prior art.

To achieve the objective above, the present disclosure provides a CFRP active-passive-confined compression-cast RC column incorporating cathodic protection, which includes a CFRP pipe; multiple longitudinal reinforcements positioned inside the CFRP pipe; a stirrup connected to the multiple longitudinal reinforcements and positioned inside the CFRP pipe; compression-cast concrete arranged in the CFRP pipe, where the multiple longitudinal reinforcements and the stirrup are embedded in the compression-cast concrete; and a power supply having a positive electrode connected to the CFRP pipe, and a negative electrode connected to the plurality of longitudinal reinforcements. The CFRP pipe with a present thickness is configured to form an active confinement on the compression-cast concrete, and the power supply is configured to apply a current to the CFRP pipe as an anode to enable the plurality of longitudinal reinforcements to obtain electrons, thus stably protecting the plurality of longitudinal reinforcements as a cathode.

In a possible implementation mode, the CFRP active-passive-confined compression-cast RC column incorporating cathodic protection further includes a pipe thickness adjusting assembly, which is positioned outside the CFRP pipe to increase a thickness of the CFRP pipe, thus enabling the CFRP pipe with the present thickness to maintain the active confinement on the compression-cast concrete.

In a possible implementation mode, the pipe thickness adjusting assembly includes a sensor connected to the CFRP pipe and configured to monitor the present thickness of the CFRP pipe; a controller connected to the sensor; and an actuator connected to the controller, where the controller is configured to control the actuator to adjust the present thickness of the CFRP pipe.

In a possible implementation mode, the stirrup is a spiral stirrup, which is wound around an outer side of the longitudinal reinforcements.

In a possible implementation mode, the multiple longitudinal reinforcements are electrically connected to one another, the negative electrode of the power supply is connected to the plurality of longitudinal reinforcements via a cathode lead-out wire, and the positive electrode of the power supply is connected to the CFRP pipe via an anode lead-out wire.

In a possible implementation mode, the CFRP active-passive-confined compression-cast RC column incorporating cathodic protection further includes a multimeter having one end connected to the cathode lead-out wire and the other end connected to a calomel electrode embedded in the compression-cast concrete; and/or
a solar panel connected to the power supply and configured to store electricity and supply power to the power supply.

In order to achieve the objective above, the present disclosure further provides a compression casting device, which is used to prepare the CFRP active-passive-confined compression-cast RC column incorporating cathodic protection of any of above solutions. The compression casting device includes a bottom plate and a top plate; a formwork holder connected to the bottom plate and the top plate and connected to an outer wall of a CFRP pipe; a high-pressure jack connected to the top plate; and a squeeze head connected to the high-pressure jack and configured to press against the compression-cast concrete in the CFRP pipe.

In order to achieve the objective above, the present disclosure further provides a method for preparing a CFRP active-passive-confined compression-cast RC column incorporating cathodic protection. The method for preparing a CFRP active-passive-confined compression-cast RC column incorporating cathodic protection is used to prepare the CFRP active-passive-confined compression-cast RC column incorporating cathodic protection of any of above solutions, and includes the following steps:
designing target parameters of the CFRP active-passive-confined compression-cast RC column incorporating cathodic protection, wherein the target parameters comprise a concrete mix proportion, a longitudinal reinforcement ratio, a stirrup ratio, a present thickness of a CFRP pipe, and compression casting stress of compression-cast concrete;
constructing the CFRP pipe on a formwork holder according to the present thickness;
enabling multiple longitudinal reinforcements and a stirrup to form an internal reinforcement assembly according to the longitudinal reinforcement ratio and the stirrup ratio, and placing the internal reinforcement assembly into the CFRP pipe; and
pouring concrete into the formwork holder according to the concrete mix proportion, and carrying out compression casting according to the compression casting stress to obtain a CFRP active-passive-confined compression-cast RC column incorporating cathodic protection.

In a possible implementation mode, the target parameters further include the target parameters further comprise a present current density applied by a power supply. The designing target parameters of the CFRP active-passive-confined compression-cast RC column incorporating cathodic protection specifically includes the following steps: acquiring a concrete mix proportion, a longitudinal reinforcement ratio, a stirrup ratio, an initial thickness of the CFRP pipe, and initial stress of the compression-cast concrete of the CFRP active-passive-confined compression-cast RC column incorporating cathodic protection; calculating an initial bearing force of a RC column according to the concrete mix proportion, the longitudinal reinforcement ratio, the stirrup ratio, the initial thickness and the initial stress of the CFRP active-passive-confined compression-cast RC column incorporating cathodic protection; acquiring an initial current density of the RC column, when the initial bearing force is greater than or equal to a target bearing force; acquiring a corrosion potential of the plurality of longitudinal reinforcements after applying a current to the CFRP pipe according to the initial current density, and acquiring a residual thickness of the CFRP pipe, when the corrosion potential is in a potential threshold; and calculating an intermediate bearing force of the RC column according to the residual thickness, and determining the present thickness of the CFRP pipe, the compression casting stress, and the present current density applied by the power supply, when the intermediate bearing force is greater than or equal to the target bearing force.

In a possible implementation mode, the method for preparing further includes the following steps: adjusting the initial thickness and/or the initial stress until the initial bearing force calculated is greater than or equal to the target bearing force, when the initial bearing force is less than the target bearing force.

The beneficial effects are as follows: according to a CFRP active-passive-confined compression-cast RC column incorporating cathodic protection provided by the present disclosure, in the RC column, an active confinement on internal compression-cast concrete is formed by a CFRP pipe (i.e., a CFRP pipe), a stirrup is connected to multiple longitudinal reinforcements, and a power supply is configured to apply a current to the CFRP pipe to protect the multiple longitudinal reinforcements, such that the bearing capacity of the whole RC column member meets the requirements, the corrosion of the multiple longitudinal reinforcements can be effectively inhibited, and the seismic performance of the RC column is further improved.

In addition to the technical problems solved by the present disclosure, the technical features that constitute the technical solution and the beneficial effects brought by the technical features of these technical solutions, other technical problems that can be solved by the CFRP active-passive-confined compression-cast RC column incorporating cathodic protection provided by the present disclosure, other technical features included in the technical solution and the beneficial effects brought by these technical features may be further explained in detail in specific embodiments.

BRIEF DESCRIPTION OF THE DRAWINGS

To describe the technical solutions of the present disclosure or in the prior art more clearly, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

FIG. 4 is a flow diagram of a preferred embodiment of a method for preparing a CFRP active-passive-confined compression-cast RC column incorporating cathodic protection according to the present disclosure;

Figure 1:
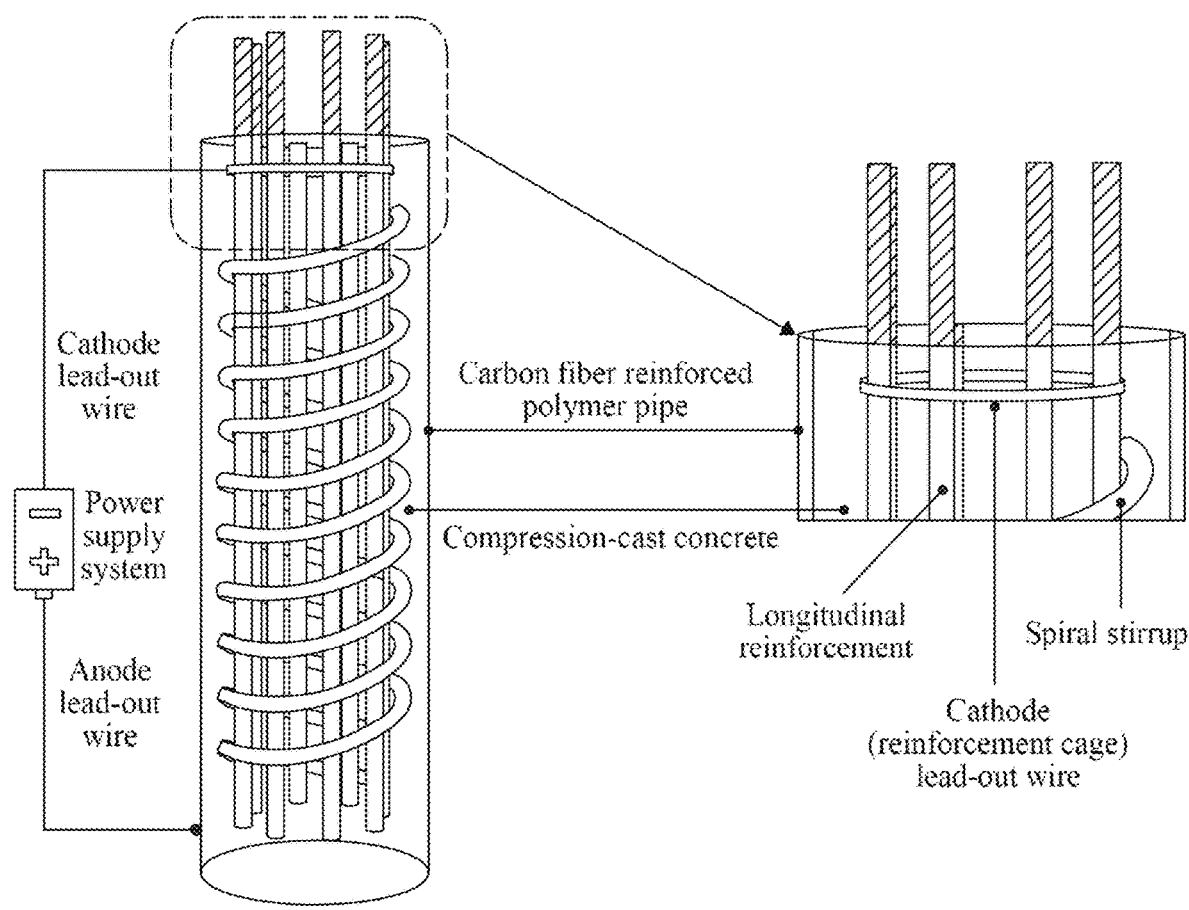
FIG. 1 is a structural schematic diagram of a CFRP active-passive-confined compression-cast RC column incorporating cathodic protection according to an embodiment of the present disclosure.

In the drawings:
1—high-pressure jack; 2—sensor; 3—nut; 4—top plate; 5—squeeze head; 6—screw; 7—formwork holder; 8—CFRP pipe; 9—bottom plate.

DETAILED DESCRIPTION OF THE EMBODIMENTS

To make the objectives, technical solutions and effects of the present disclosure more clearly and apparently, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the scope of protection of the present disclosure.

First, the terms involved in the embodiment of the present disclosure are introduced below.

CFRP is the abbreviation of CFRP, which has main characteristics as follows: high strength and high stiffness, the specific strength of carbon fiber (a ratio of strength to density) is much higher than that of a traditional metal material, such as steel and aluminum, which enables the CFRP to bear a large load while maintaining lightweight; good fatigue performance, the fatigue performance of the CFRP under long-term cyclic loading is better than that of metal, and thus the CFRP is suitable for structural components under periodic load; low thermal expansion coefficient, CFRP has a low thermal expansion coefficient, which makes it stable in size under temperature changes and suitable for precision equipment; and corrosion resistance, compared with the traditional metal material, the CFRP has stronger corrosion resistance to the environment and longer service life.

For the problem of poor seismic performance of the concrete caused by a situation that the RC structure is easy to corrode in a coastal environment in the prior art, the present disclosure provides a CFRP active-passive-confined compression-cast RC column incorporating cathodic protection. In the RC, an active confinement on the internal compression-cast concrete is formed by the CFRP pipe, the stirrup is connected to the multiple longitudinal reinforcements, and the power supply is configured to apply a current to the CFRP pipe to protect the multiple longitudinal reinforcements, such that the bearing capacity of the whole RC column member meets the requirements, the corrosion of the multiple longitudinal reinforcements can be effectively inhibited, and the seismic performance of the RC column is further improved. Therefore, the technical problem of poor seismic performance of concrete caused by a situation which the RC structure is easy to corrode in a coastal environment in the related technology is solved.

Because the RC structure in the costal environment is easily influenced by corrosive medium to lead to the corrosion of internal reinforcement assembly, the CFRP active-passive-confined compression-cast RC column incorporating cathodic protection provided by the present disclosure is a cathodic protection means with external current by taking an external CFRP pipe (i.e., CFRP pipe) as an anode and longitudinal reinforcements (i.e., steel bars) in concrete as a cathode, which can effectively control the degree of corrosion of internal reinforcement assembly. Because the CFRP pipe outside the ordinary cast CFRP pipe concrete is hard to form active confinement, and has great limitations in improving the performance of concrete, a compression casting method is introduced by the present disclosure, making the external CFRP pipe form the active confinement during casting, so as to form a three-dimensional compression state. The compactness of the concrete is improved, and the performance of the RC column is further improved.

The technical solution of the present disclosure and how the technical solution of the present disclosure can solve the above technical problems may be described in detail below with specific embodiments. The above specific embodiments can be combined with each other, and the same or similar concepts or processes may not be repeated in some embodiments.

As shown in FIG. 1, an embodiment of the present disclosure provides a CFRP active-passive-confined compression-cast RC column incorporating cathodic protection. The CFRP active-passive-confined compression-cast RC column incorporating cathodic protection includes a CFRP pipe; multiple longitudinal reinforcements (i.e., steel bars) inside the CFRP pipe; a stirrup inside the CFRP pipe connected to the multiple longitudinal reinforcements; compression-cast concrete arranged in the CFRP pipe, where the multiple longitudinal reinforcements and stirrups are embedded in the compression-cast concrete; and a power supply, where a positive electrode of the power supply is connected to the CFRP pipe, and a negative electrode of the power supply is connected to the multiple longitudinal reinforcements. The CFRP pipe with a present thickness forms an active confinement on the compression-cast concrete, and the power supply applies a current to the CFRP pipe which serves as an anode to enable the multiple longitudinal reinforcements to obtain electrons, thus stably protecting the multiple longitudinal reinforcements as a cathode.

It should be noted that the working principle of the present disclosure is as follows: a corrosion-resistant CFRP pipe is used to replace a cylinder wall part of a compression-cast steel mold (as shown in FIG. 1), and a longitudinal height of the concrete may be reduced due to the pressure provided by compression casting, resulting in a lateral expansion trend. Pressure is exerted on an inner wall of the CFRP pipe to cause circumferential deformation, thus providing active confinement for the RC structure. After the compression casting is finished and the concrete is hardened, the CFRP pipe and the RC are demolded together to obtain a compression-cast RC column. The CFRP pipe is also used as an anode of ICCP (Impressed current cathodic protection), and a certain amount of current is supplied to the reinforcements by an external DC power supply, such that the surfaces of the reinforcements (i.e., the longitudinal reinforcements as a cathode) is cathodically polarized, and the longitudinal reinforcements as the cathode can obtain electrons, so the corrosion of reinforcements caused by anodic reaction (Fe is oxidized into $Fe^{2+}$) is inhibited, thereby preventing the corrosion of the longitudinal reinforcement. The present disclosure provides an innovative concept of active confinement, compared with the passive confinement in the prior art, the active confinement can actively adjust the confinement force through external control means, which enables the active confinement dynamically adjusted according to the actual working conditions and requirements of the structure, thus adapting to different load and deformation conditions of the whole RC column.

The CFRP active-passive-confined compression-cast RC column (structure or member) incorporating cathodic protection provides active confinement to the compression-cast concrete by the CFRP pipe, and can determine the pressure range of the compression casting and the reasonable range of the protection current density. The degree of corrosion of the internal reinforcement assembly (longitudinal reinforcements and the stirrup) can be effectively controlled by starting a cathodic protection function (i.e., applying the current to the CFRP pipe by the power supply). The RC column (member) provided by the present disclosure can effectively control the degree of corrosion of the reinforcements in a coastal member while improving the seismic performance of the member.

It should be noted that active confinement is mainly formed during the making of members and use of RC columns. In the process of making the RC column, the RC expands laterally under the action of the pressure, making the carbon fiber tube generate initial deformation to form active confinement on the RC column. A pipe thickness adjusting assembly is configured to adjust a thickness of the CFRP pipe, making the CFRP pipe (carbon fiber tube) continue to form active confinement on the compression-cast concrete due to the pressure. The passive confinement is mainly formed during the use of members, and the concrete is pressed to produce lateral deformation. Due to the deformation of concrete, the carbon fiber tube further forms passive confinement.

In an embodiment of the present disclosure, the CFRP active-passive-confined compression-cast RC column further includes the pipe thickness adjusting assembly, which is positioned at an outer side of the CFRP pipe and configured to increase a thickness of the CFRP pipe, making the CFRP pipe with a present thickness maintain the active confinement on the compression-cast concrete.

In an embodiment of the present disclosure, the pipe thickness adjusting assembly includes a sensor connected to the CFRP pipe and configured to monitor a present thickness of the CFRP pipe; a controller connected to the sensor; and an actuator connected to the controller and configured to control the actuator to adjust the present thickness of the CFRP pipe.

Specifically, the sensor, the controller, the actuator and the other assemblies are configured for real-time monitoring and controlling (monitoring and controlling a thickness of the CFRP pipe), such that the active confinement can accurately adjust and control a confinement force of the structure, thus meeting design requirements and performance demands.

It may be understood that the thickness of the CFRP pipe can be increased in real time through the pipe thickness adjusting assembly during operation and maintenance process of the member according to the loss degree of the CFRP pipe, thus ensuring that the CFRP pipe with the present thickness can maintain the active confinement on the compression-cast concrete.

In an embodiment of the present disclosure, the stirrup is a spiral stirrup, which is wound around an outer side of the longitudinal reinforcements.

Figure 2:
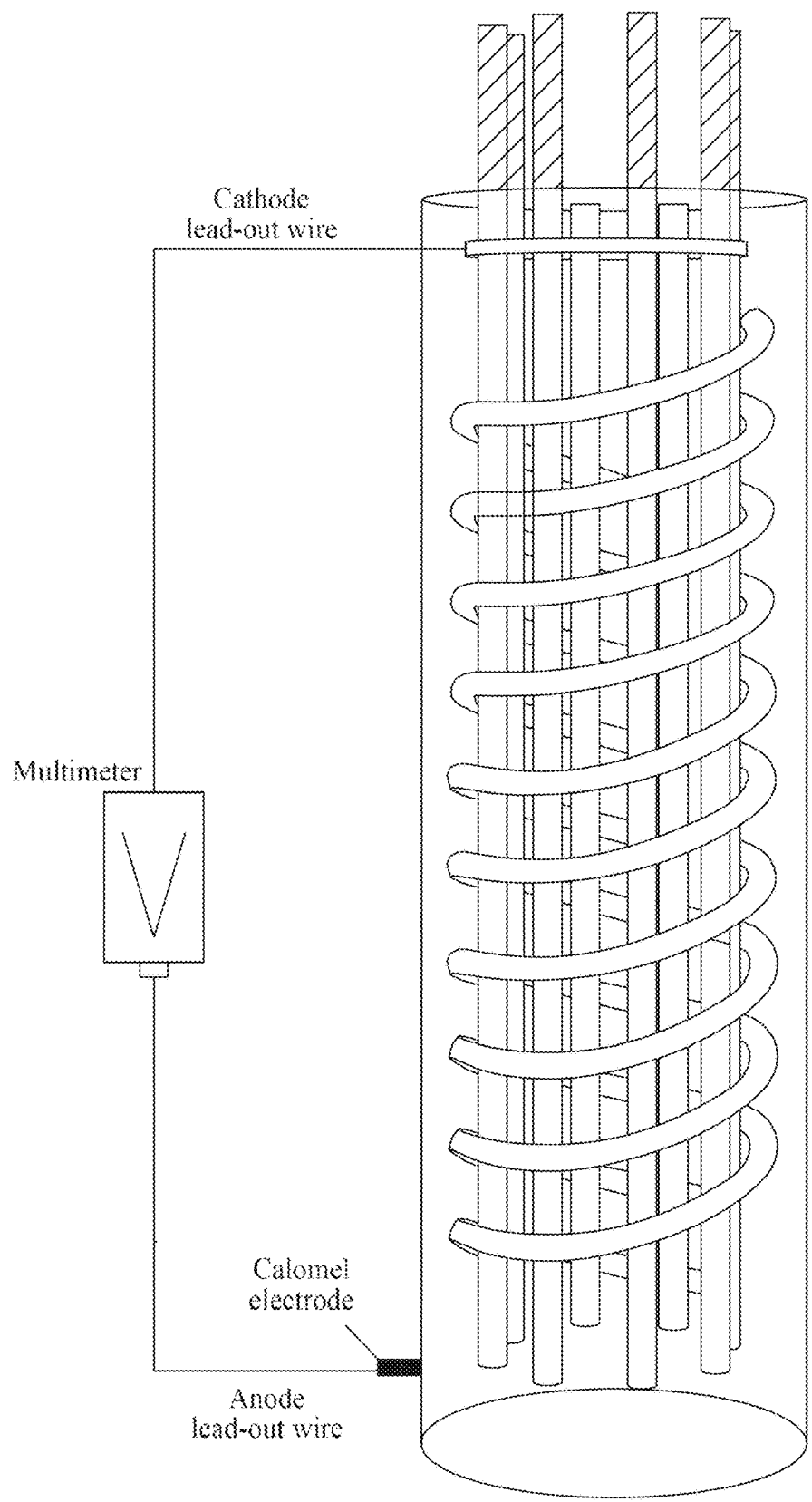
FIG. 2 is a schematic diagram of a corrosion monitoring system of a CFRP active-passive-confined compression-cast RC column incorporating cathodic protection according to an embodiment of the present disclosure.

Specifically, as shown in FIG. 1 or FIG. 2, the stirrup is a spiral stirrup, which may be made of the same material as the longitudinal reinforcement. In this embodiment, the spiral stirrup is also made of steel. The spiral stirrup is wound around a cylindrical outer end formed by multiple longitudinal reinforcements, and the spiral stirrup and the multiple longitudinal reinforcements can form an internal reinforcement assembly. The internal reinforcement assembly in this embodiment is, but not limited to, a reinforcement cage. The reinforcement cage is only one form of the internal reinforcement assembly, and the other forms include, but are not limited to, an I-beam and profile steel.

In an embodiment of the present disclosure, the multiple longitudinal reinforcements are electrically connected to one another, a negative electrode of the power supply is connected to the multiple longitudinal reinforcements via a cathode lead-out wire, and a positive electrode of the power supply is connected to the CFRP pipe via an anode lead-out wire.

Specifically, the cathode lead-out wire is configured to connect the multiple longitudinal reinforcements, and a lead wire of the cathode lead-out wire is connected to the negative electrode of the power supply, and both ends of the anode lead-out wire are directly connected to the positive electrode of the power supply and the CFRP pipe, respectively, thus forming a (the positive electrode of power supply-CFRP pipe-multiple longitudinal reinforcements-the negative electrode of power supply) current loop for cathodic protection.

In an embodiment of the present disclosure, the CFRP active-passive-confined compression-cast RC column incorporating cathodic protection further includes a multimeter. One end of the multimeter is connected to the cathode lead-out wire, a calomel electrode is embedded in the compression-cast concrete, and the other end of the multimeter is connected to the calomel electrode.

Specifically, the calomel electrode (i.e., a reference electrode) is embedded in the compression-cast concrete, the compression-cast concrete is conductive, such that a voltage and/or current can be measured between the cathode lead-out wire and the corresponding calomel electrode by the multimeter (i.e., potentiometer). That is, a corrosion monitoring system (including the multimeter, the calomel electrode, the cathode lead-out wire, and the anode lead-out wire) is added into the member according to an embodiment of the present disclosure, such that the cathodic protection function can be started in time when the longitudinal reinforcements (i.e., steel bar) in the RC column are corroded to a certain degree. As the additional rusting monitoring system (referring to FIG. 2) has a corrosion detection function, the cathodic protection function is started only when the reinforcements (longitudinal reinforcements) are corroded to a certain degree, i.e., the cathodic protection function can be started in time when the reinforcements in the RC column (i.e., member) are corroded to a certain degree, thus ensuring the seismic performance of the RC column.

In an embodiment of the present disclosure, the CFRP active-passive-confined compression-cast RC column incorporating cathodic protection further includes a solar panel, which is connected to the power supply and configured to store electricity and supply power to the power supply.

Specifically, the power supply (i.e., electric quantity storage device) and the solar panel (i.e., solar generation device) form a solar energy system, and the solar energy can be used as a power source for cathodic protection through the solar energy system.

Hence, the present disclosure has the following characteristics. First, an active confinement is provided by the CFRP pipe, that is, by replacing a part of a traditional steel mold with the anti-corrosion CFRP pipe, continuous hoop confinement can be provided for the concrete in the compression casting process. This confinement is "active", indicating that the confinement can be adjusted according to a real-time demand of the structure. Second, corrosion detection function is provided: when a built-in sensor detects a certain degree of reinforcement, the system can start the cathodic protection mechanism, which is implemented by using the CFRP pipe as a sacrifice anode, and under the action of an external DC power supply, the surface of the reinforcements (as a cathode) may be polarized, thus inhibiting the anodic reaction of oxidizing iron (Fe) into iron ions (Fe2+) and preventing the longitudinal reinforcements from further corrosion. Third, a reasonable pressure range and protection current density are determined: during compression casting, the applied pressure must be accurately controlled to avoid damage to the concrete or the CFRP pipe. Similarly, the current density in the cathodic protection system also needs to be controlled within a reasonable range to effectively prevent the corrosion of the reinforcements without excessive consumption of the CFRP pipe. Fourth, the thickness of the CFRP pipe increases in real time: with the passage of service time, wear or loss may occur on the CFRP pipe, and the structure provided by the present disclosure can increase the thickness of the CFRP pipe in real time according to the monitored loss degree to ensure that its performance is not affected. In conclusion, by combining the active confinement capacity and cathodic protection technology of the CFRP pipe, the durability (the degree of corrosion of the reinforcements) in the coastal environment and other corrosion environments can be effectively controlled, while the overall seismic performance of the member is improved. The present disclosure provides higher flexibility, self-repair ability, and adaptability to changeable environment.

Figure 3:
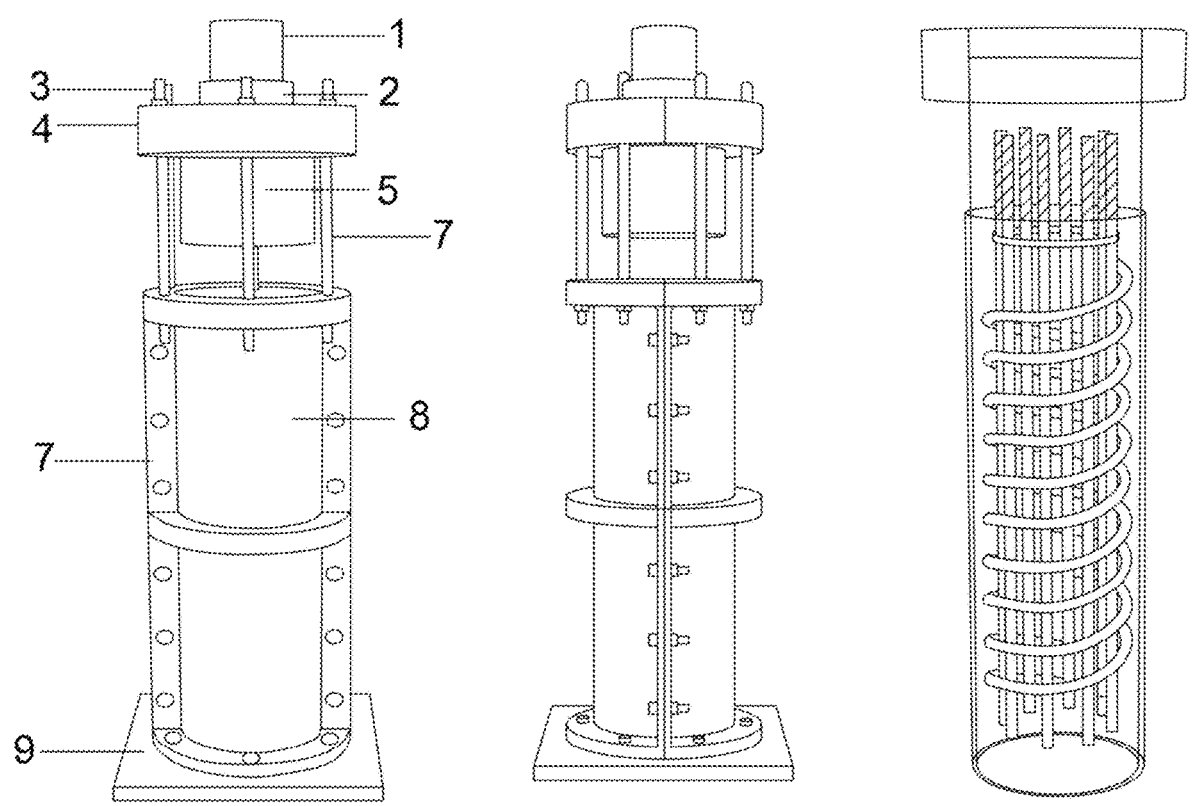
FIG. 3 is a structural schematic diagram of a compression casting device according to an embodiment of the present disclosure.

Based on above embodiments, as shown in FIG. 3, the present disclosure further provides a compression casting device for preparing the CFRP active-passive-confined compression-cast RC column incorporating cathodic protection according to any of above solutions. The compression casting device includes a bottom plate 9 and a top plate 4; a formwork holder 7 connected to the bottom plate 9 and the top plate 4, and connected to an outer wall of a CFRP pipe; a high-pressure jack 2 connected to the top plate 4; and a squeeze head 5 connected to the high-pressure jack 1 and configured to press against the compression-cast concrete in the CFRP pipe.

Specifically, a front view of the compression casting device, a left view of the compression casting device and a detailed view of the squeeze head 5 are sequentially shown in FIG. 3 from left to right. The compression casting device includes a high-pressure jack 1, a sensor 2, a nut 3, a top plate 4, a squeeze head 5, a screw 6, a formwork holder 7, and a bottom plate 9. The formwork holder 7 can abut against the CFRP pipe 8, the top plate 4 is connected to the formwork holder 7 via the screw 6, and the nut 3 is connected to the screw 6 to fix the top plate 4. The high-pressure jack 1 is arranged on the top plate 4, and a lower end of the high-pressure jack 1 is connected to the squeeze head 5. The squeeze head 5 moves downwards to make concrete in the formwork holder 7 form compression-cast concrete. In the process of preparing the RC column, the compression casting pressure and/or distance is detected through the sensor 2 to guarantee that the preset requirement is met.

Based on above embodiments, as shown in FIG. 4, the present disclosure further provides a method for preparing a CFRP active-passive-confined compression-cast RC column incorporating cathodic protection. The method for preparing a CFRP active-passive-confined compression-cast RC column incorporating cathodic protection is used to prepare the CFRP active-passive-confined compression-cast RC column incorporating cathodic protection of any of above solutions, and includes the following steps.

Step S101. Target parameters of the CFRP active-passive-confined compression-cast RC column incorporating cathodic protection are designed, and include a concrete mix proportion, a longitudinal reinforcement ratio, a stirrup ratio, a present thickness of a CFRP pipe, and compression casting stress of the compression-cast concrete.

In an implementation mode, the target parameters further include a present current density applied by the power supply. In the process of determining the target parameters, a concrete mix proportion, a longitudinal reinforcement ratio, a stirrup ratio, an initial thickness of the CFRP pipe and initial stress of the compression-cast concrete of the CFRP active-passive-confined compression-cast RC column incorporating cathodic protection are acquired. An initial bearing force of a RC column is calculated according to the concrete mix proportion, the longitudinal reinforcement ratio, the stirrup ratio, the initial thickness, and the initial stress. An initial current density of the RC column is acquired if the initial bearing force is greater than or equal to a target bearing force. A corrosion potential of the multiple longitudinal reinforcements is acquired after applying a current to the CFRP pipe according to the initial current density, and a residual thickness of the CFRP pipe is acquired if the corrosion potential is in a potential threshold. An intermediate bearing force of the RC column is calculated according to the residual thickness, and if the intermediate bearing force is greater than or equal to the target bearing force, the present thickness of the CFRP pipe, the compression casting stress and the present current density applied by the power supply are determined.

It should be noted that Step S101 is to output three important target parameters, including the present thickness of the CFRP pipe, the compression casting stress of the compression-cast concrete, and the present current density applied by the power supply.

In a possible implementation mode, the method for preparing further includes the following steps: if the initial bearing force is less than the target bearing force, the initial thickness and/or the initial stress is adjusted until the calculated initial bearing force is greater than or equal to the target bearing force.

In the parameter determination process in Step S101, during the manufacturing of member, a CFRP-confined compression-cast RC column meeting an actual strength requirement is designed and manufactured. During operation and maintenance, the protection current density is adjusted to inhibit the corrosion of the reinforcement, a cracking condition of the CFRP is monitored, and the thickness is adjusted at proper time to maintain the effective confinement on the RC column. Calculation and evaluation:

the bearing force of the member is calculated according to given initial parameters (such as the thickness of the CFRP, the compression casting stress), and the protection current density is preliminarily determined according to environmental factors and reinforcement performance. Optimization and adjustment: if the bearing force does not meet the target requirement, the parameters are adjusted until the target requirement is met. Meanwhile, the corrosion status of the reinforcements is evaluated based on the corrosion electrochemical principle, and the cathodic protection effect is detected. Long-term monitoring: in design service life of the member, the bearing force of the member and the thickness of the CFRP are continuously measured to ensure that the bearing force and the thickness are in a proper range. Output of design parameters: key parameters such as the thickness of the CFRP, the compression casting stress and the protection current density are finally determined to complete the design.

Step S102. The CFRP pipe is constructed on a formwork holder according to the present thickness.

It should be noted that in the method for preparing, the CFRP pipe is used as both a formwork and an anode for cathodic protection, thus solving the problem of corrosion of internal reinforcement assembly of the concrete. Meanwhile, the compression casting method is introduced to make the CFRP pipe gradually form an active confinement during concrete casting, which works together with the pre-pressure exerted by compression casting to make the concrete in a three-dimensional compression state, thus further improving the performance of the concrete.

Step S103. Multiple longitudinal reinforcements and a stirrup form an internal reinforcement assembly according to the longitudinal reinforcement ratio and the stirrup ratio, and the internal reinforcement assembly is placed into the CFRP pipe.

Step S104. Concrete is poured into the formwork holder according to the concrete mix proportion, and compression casting is carried out according to the compression casting stress to obtain a CFRP active-passive-confined compression-cast RC column incorporating cathodic protection.

During the manufacturing of member, the CFRP-confined compression-cast RC column is designed and manufactured, making the actual strength of the RC column meet the design requirements. During operation and maintenance, due to the addition of the protection current, on the one hand, the corrosion of the internal reinforcement assembly of the concrete can be effectively inhibited, on the other hand, the CFRP may be acceleratedly degenerated due to the action of current, which makes the tensile strength and thickness of the CFRP decrease in an all-round way. In order to maintain the confinement of CFRP on the RC column without cracking, it is necessary to constantly adjust the thickness of the CFRP during use.

The logic of the present disclosure lies in the combination of the physical protection function of the CFRP pipe and the electrochemical protection function of the cathodic protection technology, which double guarantees the reinforcements from corrosion. Meanwhile, the performance of the concrete is improved by compression casting to form a comprehensive solution, which not only improves the durability of the structure but also enhances its overall performance.

The present disclosure is further described below with reference to specific embodiments and in conjunction with FIG. 5 to FIG. 8:

K1. Initial parameters of the RC column are input, including a thickness t of the CFRP, compression casting stress $f_p$, a longitudinal reinforcement ratio $\rho_l$, a stirrup ratio $\rho_v$, and a concrete mix proportion $\omega$.

In the above parameters, the longitudinal reinforcement ratio $\rho_l$, the stirrup ratio $\rho_v$ and the concrete mix proportion $\omega$ are constant values after the material is determined, the main factors affecting the bearing capacity F of the member include the thickness t of the CFRP, and the compression casting stress $f_p$.

K2. The bearing force F of the member is calculated according to formula (1), and a curve of a relationship between the bearing force F of the member and the thickness t of the CFRP as well as the compression casting stress $f_p$ is as shown in FIG. 4.

$$F = f(t, f_p, \omega, \rho_l, \rho_v) \tag{1}$$

Figure 5:
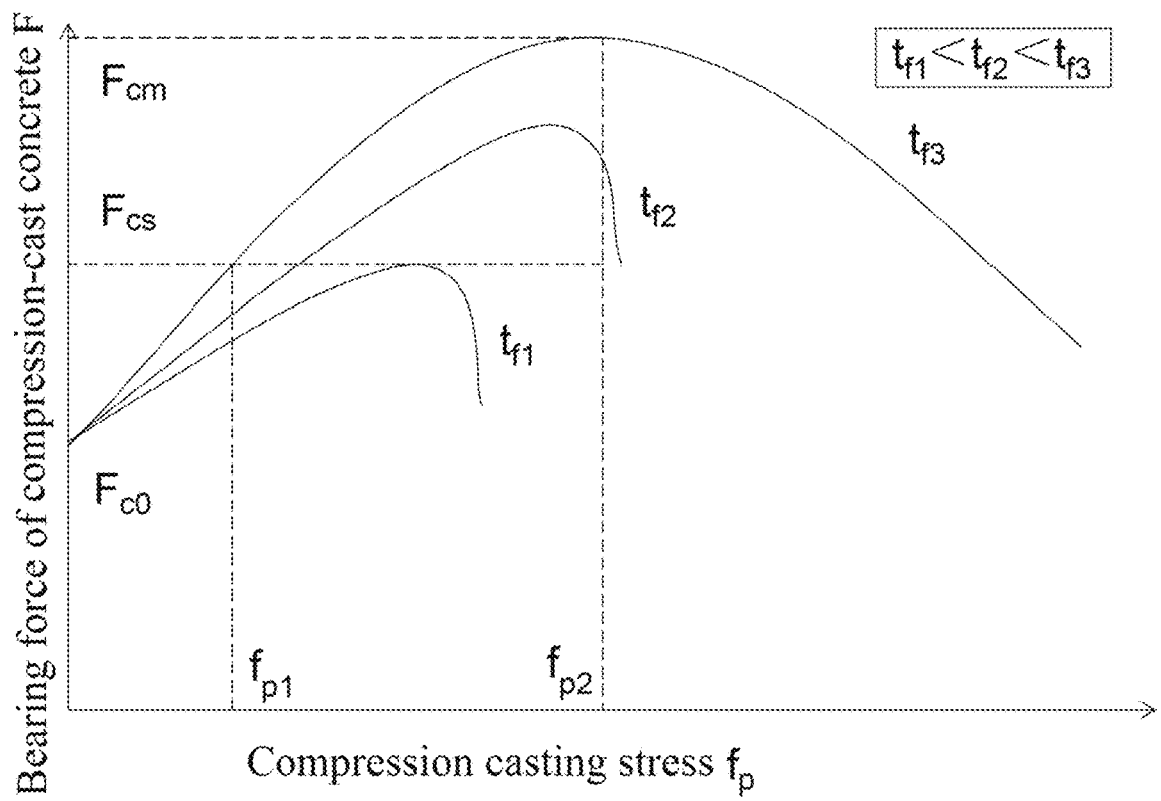
FIG. 5 is a curve showing a relationship between a member bearing force F and a thickness t of CFRP and compression casting stress $f_p$ in a method for preparing a CFRP active-passive-confined compression-cast RC column incorporating cathodic protection according to the present disclosure.

In FIG. 5, the right parts of the three curves drop almost vertically, this is because CFRP has been damaged under this compression pouring stress, and the concrete collapses immediately after losing the confinement, and the bearing force drops to zero. In FIG. 5, $F_{c0}$ is an initial bearing force of the concrete before applying the compression-cast concrete, $F_{cs}$ is a target bearing force of the compression-cast concrete, and $F_{cm}$ is the maximum bearing force of the compression-cast concrete. $t_f$ represents the thickness of the CFRP, where $t_{f1}$ represents a critical thickness that just meets the bearing force requirement, and $t_{f3}$ represents a critical thickness that just can reach the maximum bearing force, and $f_{p1}$, $f_{p2}$ correspond to the minimum and maximum compression-cast stress, respectively.

K3. It is determined whether the bearing force F of the member meets the requirement of the target bearing force $F_{cs}$, if the bearing force meets the requirement of the target bearing force, K4 is executed, if not, it is returned to K1, and parameters are adjusted until the bearing force of the member meets the requirement.

K4. The protection current density i is preliminarily determined according to the service environment of the RC column, with a calculation formula shown in formula (2):

$$i = I(C, R); \tag{2}$$

Wherein, i is a protection current density; C is an environment impact factor; R is the reinforcement performance, I is a function of the protection current density depending on the environmental impact factor C and the reinforcement performance R.

Figure 6:
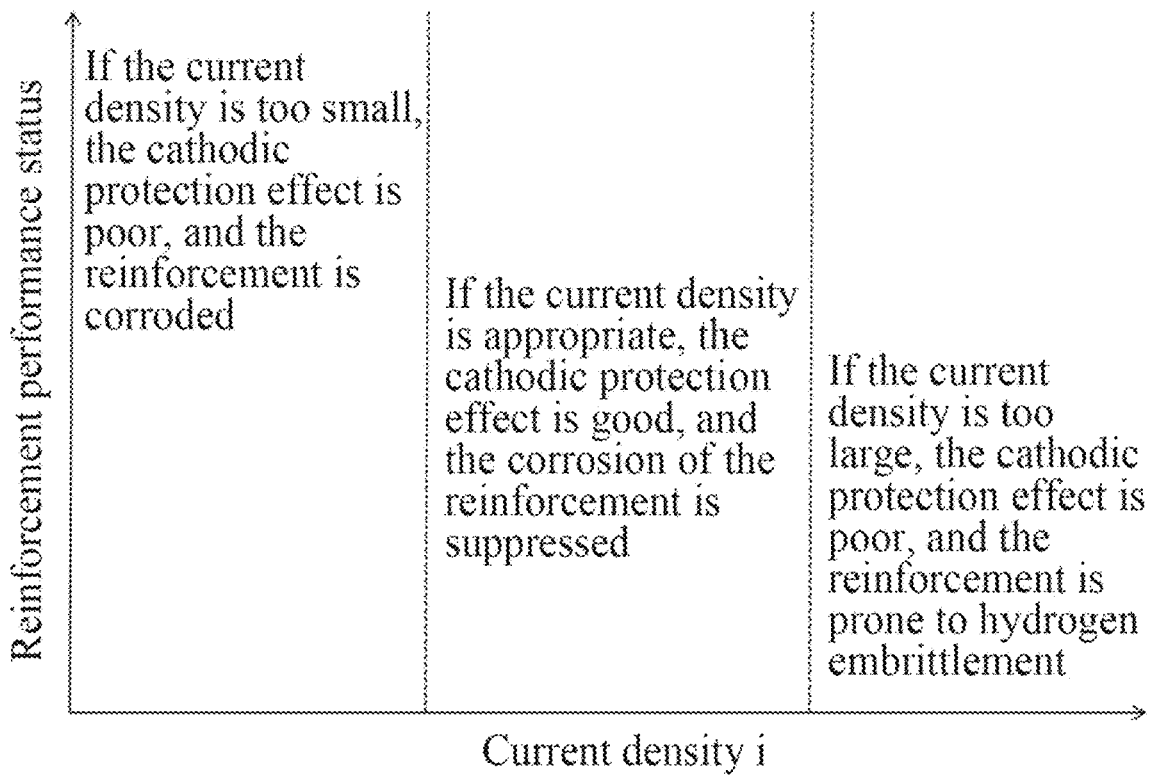
FIG. 6 is a curve showing a relationship between a thickness t of CFRP and power-on time T in a method for preparing a CFRP active-passive-confined compression-cast RC column incorporating cathodic protection according to the present disclosure.

When determining the protection current density i, because excessive current may lead to hydrogen embrittlement of reinforcements, too small current may lead to the corrosion of reinforcements, so the current density may be kept within a suitable range, as shown in FIG. 6.

K5. Based on the principle of corrosion electrochemistry, the corrosion status of the reinforcements is evaluated by using a half potential measurement method, and the cathodic protection effect is detected at the same time, thus achieving the monitorability of structural data. One end of the potentiometer is connected to a longitudinal reinforcement lead-out wire, and the other end of the potentiometer is connected to a reference electrode of an adjacent structure. The corrosion monitoring device is shown in FIG. 3. The corrosion state of the reinforcements are determined by measuring a reinforcement corrosion potential U in the concrete. In a design service life of the member, if the reinforcement corrosion potential U does not exceed an allowable potential $U_d$, it is denoted that the degrees of corrosion of the reinforcements are in an allowable range, then Step S6 is executed, if not, it is returned to Step 4.

K6. The thickness t of the CFRP is monitored in real time, and the bearing force F of the member in such a CFRP thickness t condition is calculated using formula (1).

K7. In the design service life of the member, if the bearing force F of the member meets the requirement of the target bearing force $F_{cs}$, K8 is executed, if not, it is returned to K1, and the parameters are adjusted until the bearing force F of the member meets the requirement.

Figure 7:
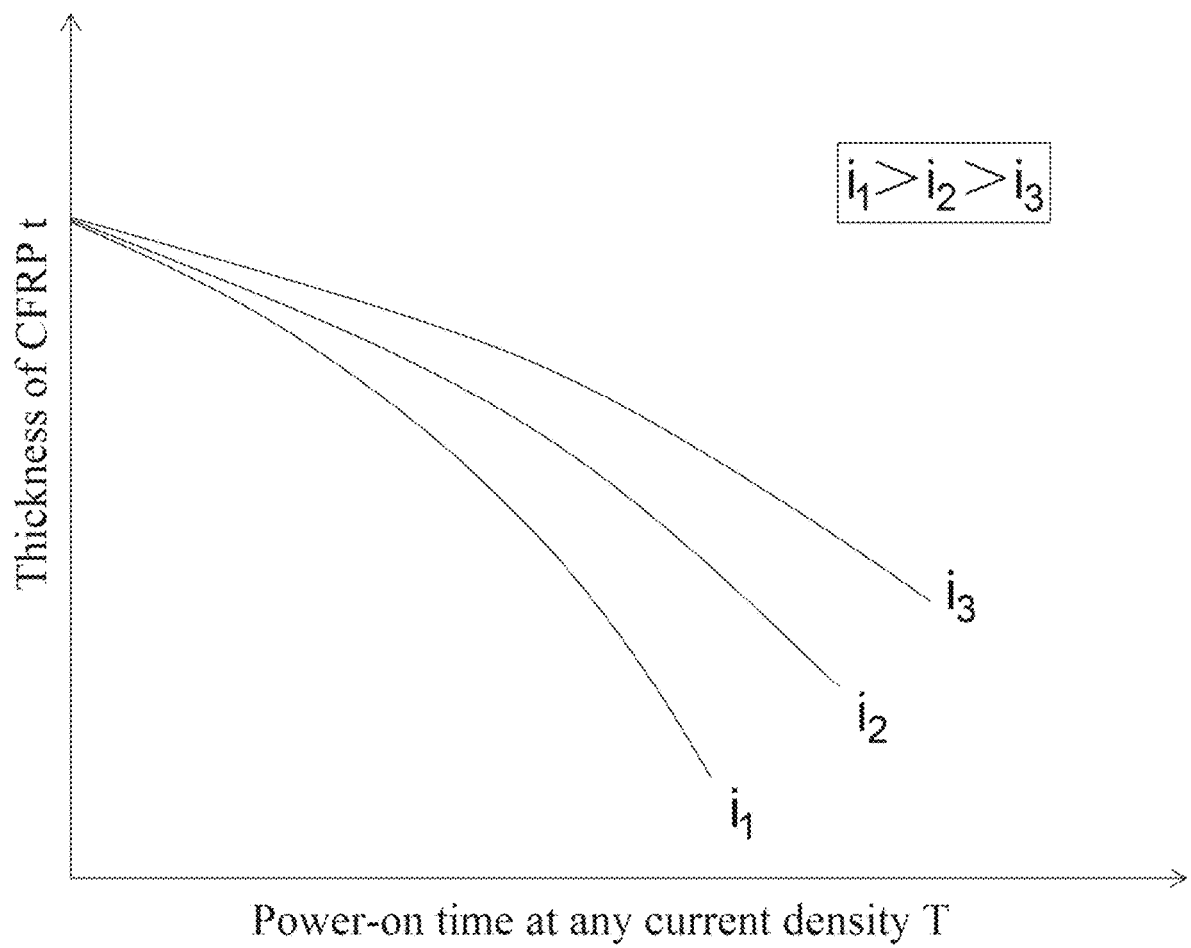
FIG. 7 is a method for preparing a CFRP active-passive-confined compression-cast RC column incorporating cathodic protection according to the present disclosure.
Figure 8:
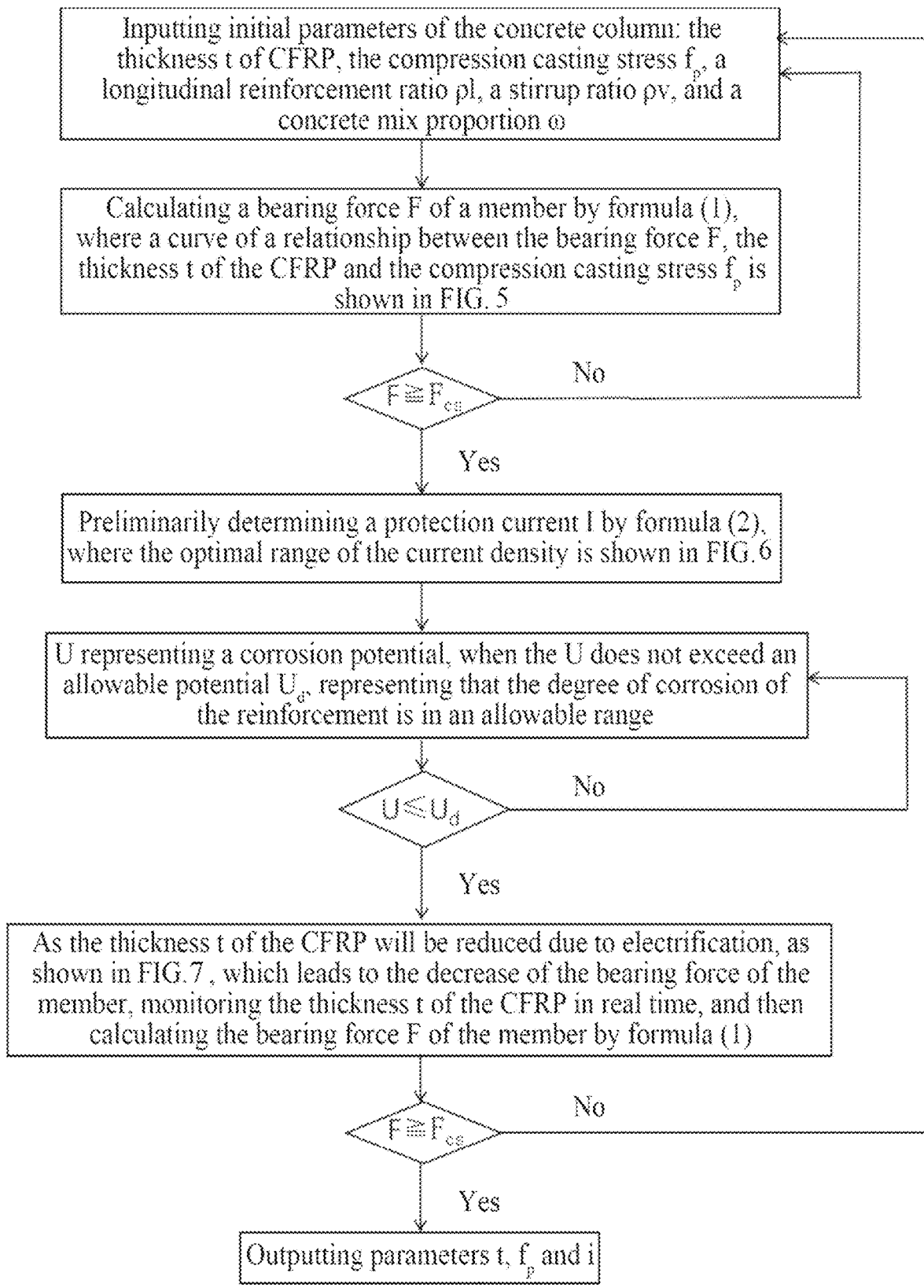
FIG. 8 is a flow diagram of parameter determination in a preferred embodiment of a method for preparing a CFRP active-passive-confined compression-cast RC column incorporating cathodic protection according to the present disclosure.

During the cathodic protection of the member, the CFRP pipe may gradually deteriorate due to the action of current, resulting in the gradual reduction of the thickness t of the CFRP pipe, and the deterioration speed is affected by the current density. As shown in FIG. 7, i represents the current density.

K8. Design parameters (i.e., target parameters) are output, and include the thickness t of the CFRP, the compression casting stress $f_p$, and a protection current density i.

In the description of the present disclosure, unless expressly specified and limited otherwise, the terms "install", "connect with", "connect to", "fix", and the like should be understood broadly, e.g., may be a fixed connection, a detachable connection, or a connection in one piece; may be a mechanical connection, an electrical connection, or mutual communication; may be a direct connection, an indirect connection through an intermediate medium, an internal communication between the two elements, or interactions between the two elements. For those of ordinary skill in the art, the specific meanings of the above terms in the present disclosure may be understood on a case-by-case basis.

In the description of the present disclosure, it should be understood that the orientation or positional relationship indicated by terms "center", "longitudinal", "lateral", "length", "width", "thickness", "upper", "lower", "front", "back", "left", "right", "vertical", "horizontal", "top", "bottom", "inside", "outside", "clockwise", "counterclockwise", "axial", "radial" and "circumferential" is based on the orientation or positional relationship shown in the drawings only for convenience of description of the present disclosure and simplification of description rather than indicating or implying that the device or element referred to must have a particular orientation, be constructed and operate in a particular orientation, and thus are not to be construed as limiting the present disclosure.

Furthermore, the terms "first" and "second" are used for descriptive purposes only and are not to be construed as indicating or implying relative importance or implying the number of the indicated technical features. Thus, the feature defined by "first" and "second" can explicitly or implicitly include one or more features. In the description of the present disclosure, "a plurality of" means at least two, e.g., two, three, and more, unless otherwise specifically defined.

It should be noted that in the present disclosure, unless otherwise specified and limited, the first feature is "above" or "below" the second feature, including that the first feature is in direct contact with the second feature, or that the first feature and the second feature are in indirect contact with each other through an intermediate medium. Moreover, the first feature is "above", "on" and "over" the second feature, including that the first feature is above and at an inclined top of the second feature, or only indicating that a horizontal height of the first feature is higher than that of the second feature. The first feature is "below", "under" and "beneath" the second feature, including that the first feature is below and at an inclined bottom of the second feature, or only indicating that a horizontal height of the first feature is lower than that of the second feature.

The terms "first", "second", "third" and "fourth" (if any) in the specification and claims of the present disclosure and the above-accompanying drawings are used to distinguish similar objects, rather than describing a specific sequence or alternatively order. It should be understood that the data used can be interchanged under appropriate circumstances, so that the embodiments described herein can be implemented in other orders than those illustrated or described herein. Moreover, the terms "include", "contain" and any other variants mean to cover the non-exclusive inclusion. For example, a process, method, system, product, or equipment including a series of steps or units is not necessarily limited to those explicitly listed, but may also include other steps or units that are not explicitly listed but are inherent to these processes, methods, products or equipment.

In the description of this specification, descriptions referring to the terms "an embodiment", "some embodiments", "exemplary embodiments", "examples", "specific examples" or "some examples" mean that specific features, structures, materials or characteristics described in connection with this embodiment or example are included in at least one embodiment or example of the present disclosure. In this specification, the schematic representations of the above terms are not necessarily aimed at the same embodiment or example. Moreover, specific features, structures, materials or characteristics described may be combined in any one or more embodiments or examples in a suitable manner.

In general, the terms should be understood at least in part by use in context. For example, depending at least in part on the context, the term "one or more" as used herein can be used to describe any feature, structures, or characteristics of the singular, or can be used to describe a combination of features, structures or characteristics of the plural. Similarly, depending at least in part on the context, the terms such as "a" or "the" may also be understood as conveying singular usage or plural usage.

It should be easily understood that "above . . . ", "on . . . " and "over . . . " in the present disclosure should be interpreted in the broadest way, such that "above . . . " means not only "directly above something" but also "above something" with intermediate features or layers therebetween, and "on . . . " and "over . . . " mean not only include "on something" or "over something", or "on something" or "over something" without intermediate features or layers therebetween.

Herein, for convenience of explanation, spatial relative terms, such as "below", "under", "beneath", "on" and "above" can be used to describe the relationship of one element or feature with other elements or features as shown in the figure. Spatial relative terms are intended to encompass different orientations of devices in use or operation other than those shown in the accompanying drawings. The device may have other orientations (rotated by 90 degrees or in other orientations), and the spatial relative descriptors used herein may also be interpreted accordingly.

Finally, it should be noted that the above embodiments are only used to illustrate the technical solution of the present disclosure rather than limiting. Although the present disclosure has been described in detail with reference to the foregoing embodiments, those of ordinary skill in the art should understand that it is still possible to modify the technical solution described in the foregoing embodiments, or to replace some technical features with equivalents. However, these modifications or substitutions do not make the essence of the corresponding technical solutions deviate from the spirit and scope of the technical solutions of various embodiments of the present disclosure.

What is claimed is:

1. A carbon fiber-reinforced polymer (CFRP) active-passive-confined compression-cast reinforced concrete (RC) column incorporating cathodic protection, comprising:
   a CFRP pipe;
      a plurality of longitudinal reinforcements positioned inside the CFRP pipe;
      a stirrup positioned inside the CFRP pipe and connected to the plurality of longitudinal reinforcements;
      compression-cast concrete arranged in the CFRP pipe, wherein the plurality of longitudinal reinforcements and the stirrup are embedded in the compression-cast concrete; and
      a power supply having a positive electrode connected to the CFRP pipe, and a negative electrode connected to the plurality of longitudinal reinforcements; and
      a pipe thickness monitoring assembly positioned outside the CFRP pipe and configured to measure a wall thickness of the CFRP pipe, and send, based on a measured wall thickness, a signal for physically adjusting the wall thickness of the CFRP pipe so as to enable the CFRP pipe to maintain the active confinement on the compression-cast concrete;
      wherein the CFRP pipe with a present thickness is configured to form an active confinement on the compression-cast concrete, and the power supply is configured to apply a current to the CFRP pipe as an anode to enable the plurality of longitudinal reinforcements to obtain electrons, thus stably protecting the plurality of longitudinal reinforcements as a cathode.

2. The CFRP active-passive-confined compression-cast RC column incorporating cathodic protection according to claim 1, wherein the pipe thickness monitoring assembly comprises:
   a sensor connected to the CFRP pipe and configured to measure the present wall thickness of the CFRP pipe; and
   a controller connected to the sensor and sending, based on the measured wall thickness, the signal indicative of physically adjusting the wall thickness of the CFRP pipe.

3. The CFRP active-passive-confined compression-cast RC column incorporating cathodic protection according to claim 1, wherein the stirrup is a spiral stirrup, and the spiral stirrup is wound around an outer side of the plurality of longitudinal reinforcements.

4. The CFRP active-passive-confined compression-cast RC column incorporating cathodic protection according to claim 1, wherein the plurality of longitudinal reinforcements are electrically connected to one another, the negative electrode of the power supply is connected to the plurality of longitudinal reinforcements via a cathode lead-out wire, and the positive electrode of the power supply is connected to the CFRP pipe via an anode lead-out wire.

5. The CFRP active-passive-confined compression-cast RC column incorporating cathodic protection according to claim 4, further comprising:
   a calomel electrode embedded in the compression-cast concrete and configured to be connected with one end of a multimeter, the multimeter having an other end connected to the cathode lead-out wire; and/or
   a solar panel connected to the power supply and configured to store electricity and supply power to the power supply.

6. A compression casting device for preparing the CFRP active-passive-confined compression-cast RC column incorporating cathodic protection according to claim 1, comprising:
   a bottom plate;
   a top plate;
   a formwork holder connected to the bottom plate and the top plate and connected to an outer wall of the CFRP pipe;
   a high-pressure jack connected to the top plate;
   a squeeze head connected to the high-pressure jack and configured to press against the compression-cast concrete in the CFRP pipe
   and the pipe thickness monitoring assembly of claim 1.

7. The compression casting device for preparing the CFRP active-passive-confined compression-cast RC column incorporating cathodic protection according to claim 6, wherein the pipe thickness monitoring assembly comprises:
   a sensor connected to the CFRP pipe and configured to measure the wall thickness of the CFRP pipe; and
   a controller connected to the sensor and sending, based on the measured wall thickness, the signal indicating of physically adjusting the wall thickness of the CFRP pipe.

8. The compression casting device for preparing the CFRP active-passive-confined compression-cast RC column incorporating cathodic protection according to claim 6, wherein the stirrup is a spiral stirrup, and the spiral stirrup is wound around an outer side of the plurality of longitudinal reinforcements.

9. The compression casting device for preparing the CFRP active-passive-confined compression-cast RC column incorporating cathodic protection according to claim 6, wherein the plurality of longitudinal reinforcements are electrically connected to one another, the negative electrode of the power supply is connected to the plurality of longitudinal reinforcements via a cathode lead-out wire, and the positive electrode of the power supply is connected to the CFRP pipe via an anode lead-out wire.

10. The compression casting device for preparing the CFRP active-passive-confined compression-cast RC column incorporating cathodic protection according to claim 9, further comprising:
    a calomel electrode embedded in the compression-cast concrete and configured to be connected with one end of a multimeter, the multimeter having an other end connected to the cathode lead-out wire; and/or
    a solar panel connected to the power supply and configured to store electricity and supply power to the power supply.

* * * * *